(12) United States Patent
Golconda et al.

(10) Patent No.: US 12,189,706 B2
(45) Date of Patent: Jan. 7, 2025

(54) HYBRID APPROACH FOR GENERATING RECOMMENDATIONS

(71) Applicant: Oracle International Corporation, Redwood Shores, CA (US)

(72) Inventors: Suresh Kumar Golconda, Fremont, CA (US); Saurabh Thapliyal, San Mateo, CA (US); Khaja Moinuddin Shaik Mohammed, Fremont, CA (US); Amit Arora, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/711,831

(22) Filed: Apr. 1, 2022

(65) Prior Publication Data

US 2023/0315798 A1 Oct. 5, 2023

(51) Int. Cl.
*G06F 16/9035* (2019.01)
*G06F 16/904* (2019.01)
(Continued)

(52) U.S. Cl.
CPC ........ *G06F 16/957* (2019.01); *G06F 16/9035* (2019.01); *G06F 16/904* (2019.01);
(Continued)

(58) Field of Classification Search
CPC .. G06F 16/957; G06F 16/9035; G06F 16/904; G06F 16/9535; G06F 16/9538; G06F 16/954
See application file for complete search history.

(56) References Cited

U.S. PATENT DOCUMENTS

| 10,706,450 | B1 * | 7/2020 | Tavernier | G06F 16/9535 |
| 11,625,796 | B1 * | 4/2023 | Xia | G06Q 30/0202 |
| | | | | 705/14.46 |

(Continued)

FOREIGN PATENT DOCUMENTS

| CN | 105430505 A | 3/2016 |
| CN | 107256494 A | 10/2017 |

(Continued)

OTHER PUBLICATIONS

Basiri et al., "Alleviating the Cold-Start Problem of Recommender Systems Using a New Hybrid Approach", Available online At: http://individual.utoronto.ca/_zihayatm/Papers/IST_2.pdf, Dec. 2010, pp. 962-967.

(Continued)

*Primary Examiner* — Sanchita Roy
(74) *Attorney, Agent, or Firm* — MUGHAL GAUDRY & FRANKLIN PC

(57) ABSTRACT

A processor may receive a request for a query item may include a plurality of identifying markers, relating to data associated with the query item. A machine learning model, trained to identify similar items according to the plurality of identifying markers, may then process the plurality of identifying markers and provide a list of one or more similar items and respective similarity distances. The processor may access a respective entity profile including one or more scenario scores for each of the similar items. The processor may then calculate an entity score for each respective entity profile using the respective similarity distances and the scenario scores. The processor may then generate an entity list by ranking the respective entities associated with each respective entity profile using the entity score. The processor may then output the entity list to the client device.

18 Claims, 6 Drawing Sheets

(51) Int. Cl.
  G06F 16/9535 (2019.01)
  G06F 16/9538 (2019.01)
  G06F 16/954 (2019.01)
  G06F 16/957 (2019.01)

(52) U.S. Cl.
  CPC ...... G06F 16/9535 (2019.01); G06F 16/9538 (2019.01); G06F 16/954 (2019.01)

(56) References Cited

U.S. PATENT DOCUMENTS

| | | | | |
|---|---|---|---|---|
| 2008/0120288 | A1* | 5/2008 | Guan | G06F 16/9535 707/999.005 |
| 2015/0058174 | A1* | 2/2015 | Dumon | G06Q 30/0256 705/26.64 |
| 2016/0012135 | A1* | 1/2016 | Wang | G11C 5/06 707/731 |
| 2016/0078098 | A1* | 3/2016 | Wu | G06F 16/583 705/27.2 |
| 2017/0293695 | A1* | 10/2017 | Brovman | G06Q 30/0251 |
| 2021/0034683 | A1* | 2/2021 | Iyer | G06Q 30/0603 |
| 2021/0118024 | A1* | 4/2021 | Sollami | G06Q 30/0603 |
| 2021/0192568 | A1* | 6/2021 | Taghavi Nasr Abadi | G06N 20/20 |

FOREIGN PATENT DOCUMENTS

| | | |
|---|---|---|
| CN | 112699310 A | 4/2021 |
| WO | 2019148199 A3 | 4/2020 |

OTHER PUBLICATIONS

Chandramouli et al., "StreamRec: A Real-Time Recommender System", Available online At: https://www-users.cse.umn.edu/~mokbel/demos/StreamRecDemo.pdf, Jan. 2011, 3 pages.

Fu et al., "An Improved Recommendation Method Based on Content Filtering and Collaborative Filtering", Complexity, Available online At: https://www.hindawi.com/journals/complexity/2021/5589285/, May 2021, pp. 1-11.

Moghaddam et al., "Cold Start Solutions For Recommendation Systems", Available online At: https://www.researchgate.net/profile/Mehdi-Elahi-2/publication/332511384_Cold_Start_Solutions_For_Recommendation_Systems/links/5cb894974585156cd7a24959/Cold-Start-Solutions-For-Recommendation-Systems.pdf, May 2019, 24 pages.

Saraswathi et al., "A Hybrid Approach To Solve Cold-Start Problem In Online Recommendation System", Available online At: https://papers.ssrn.com/sol3/papers.cfm?abstract_id=3134358, Apr. 2018, pp. 595-621.

Sobhanam et al., "A Hybrid Approach to Solve Cold Start Problem in Recommender Systems Using Association Rules and Clustering Technique", International Journal of Computer Applications, vol. 74, No. 4, Available online At: https://citeseerx.ist.psu.edu/viewdoc/download?doi=10.1.1.403.1935&rep=rep1&type=pdf, Jul. 2013, pp. 17-23.

Thorat et al., "Survey on Collaborative Filtering, Content-Based Filtering and Hybrid Recommendation System", International Journal of Computer Applications, vol. 110, No. 4, Jan. 2015, pp. 31-36.

* cited by examiner

HYBRID APPROACH FOR GENERATING RECOMMENDATIONS

BACKGROUND OF THE INVENTION

Frequently, websites are configured to process search queries based on techniques that compare terms in a search query to terms in potential results. This approach may be non-ideal when different results correspond to different sources. In such an instance, a result that is returned may be from a source that is unfamiliar to the user or from a source that is not credible in an area pertaining to the query. Therefore, the results of the search may be unsatisfactory for a given query.

BRIEF SUMMARY OF THE INVENTION

In an embodiment, a computer implemented method for generating an entity list is provided. A processor may receive a request for a query item. The request may include a plurality of identifying markers. The identifying markers may relate to item data associated with the query item. The processor may then apply execute a machine learning model to process the plurality of identifying markers. The machine learning model may be trained to identify similar items according to the plurality of identifying markers. The processor may receive a list of one or more similar items and respective similarity distances. The respective similarity distances may be characterized by a distance between the one or more identifying markers associated with the query item and each of the one more similar items. The processor may access a respective entity profile including one or more scenario scores for each of the similar items. The processor may then calculate an entity score for each respective entity profile using the respective similarity distances and the scenario scores. The processor may then generate an entity list by ranking the respective entities associated with each respective entity profile using the entity score. The processor may then output the entity list to the client device.

In some embodiments, the request includes text entered into a plurality of fields on the client device. One or more of the plurality of fields may include a predetermined list of identifying markers in a drop down menu.

In some embodiments, the machine learning model may calculate similarity distances between the query item and one or more past items using the plurality of identifying markers. The machine learning model may then determine one or more similar items from the one or more past items based on the similarity distances.

In some embodiments, the machine learning model may be trained by accessing the respective entity profile, where each respective entity profile includes item data associated with an item. The processor may provide the item data to the machine learning model. Identifying markers associated with the item may be generated according to a predetermined scheme using the item data. The machine learning model may be retrained, including defining new internal parameters such that the machine learning model may identify the item as similar to the query item.

In some embodiments, the processor may calculate the entity score by also calculating a total similarity score for each respective similarity distance. The total similarity scores may be within a range of 0 to 1, inclusive. The processor may then calculate a total respective scenario score by scaling each scenario score using the respective total similarity score.

In some embodiments, a system is provided. The system can include one or more data processors and a non-transitory computer readable storage medium containing instructions which, when executed on the one or more data processors, cause the one or more data processors to perform part or all of a method disclosed herein.

In an embodiment, the system may receive a request for a query item. The request may include a plurality of identifying markers. The identifying markers may relate to item data associated with the query item. The system may then apply execute a machine learning model to process the plurality of identifying markers. The machine learning model may be trained to identify similar items according to the plurality of identifying markers. The system may receive a list of one or more similar items and respective similarity distances. The respective similarity distances may be characterized by a distance between the one or more identifying markers associated with the query item and each of the one more similar items. The system may access a respective entity profile including one or more scenario scores for each of the similar items. The system may then calculate an entity score for each respective entity profile using the respective similarity distances and the scenario scores. The system may then generate an entity list by ranking the respective entities associated with each respective entity profile using the entity score. The system may then output the entity list to the client device.

In some embodiments, the system may include text entered into one of a plurality of fields displayed on a client device. The one or more of the plurality of fields may also include a predetermined list of identifying markers displayed in a drop down menu. In some embodiments, the system may receive an unknown identifying marker. The system may then update the predetermined list of identifying markers to include the unknown identifying marker. The identifying markers may include a name, an item description, and a class.

In some embodiments, the system may calculate the entity score by also calculating a total similarity score for each respective similarity distance. The total similarity scores may be within a range of 0 to 1, inclusive. The system may then calculate a total respective scenario score by scaling each scenario score using the respective total similarity score.

In some embodiments, a computer-program product is provided that is tangibly embodied in a non-transitory machine-readable storage medium. The computer-program product can include instructions configured to cause one or more data processors to perform part or all of a method disclosed herein.

The method may include the one or more processors may receiving a request for a query item. The request may include a plurality of identifying markers. The identifying markers may relate to item data associated with the query item. The processor may then apply execute a machine learning model to process the plurality of identifying markers. The machine learning model may be trained to identify similar items according to the plurality of identifying markers. The processor may receive a list of one or more similar items and respective similarity distances. The respective similarity distances may be characterized by a distance between the one or more identifying markers associated with the query item and each of the one more similar items. The processor may access a respective entity profile including one or more scenario scores for each of the similar items. The processor may then calculate an entity score for each respective entity profile using the respective similarity distances and the scenario scores. The processor may then generate an entity list by ranking the respective entities associated with each respective entity profile using the entity score. The processor may then output the entity list to the client device.

In some embodiments, the machine learning model may calculate similarity distances between the query item and one or more past items using the plurality of identifying markers. The machine learning model may then determine one or more similar items from the one or more past items based on the similarity distances.

In some embodiments, the machine learning model may be trained by accessing the respective entity profile, where each respective entity profile includes item data associated with an item. The processor may provide the item data to the machine learning model. Identifying markers associated with the item may be generated according to a predetermined scheme using the item data. The machine learning model may be retrained, including defining new internal parameters such that the machine learning model may identify the item as similar to the query item.

In some embodiments, the processor may calculate the entity score by also calculating a total similarity score for each respective similarity distance. The total similarity scores may be within a range of 0 to 1, inclusive. The processor may then calculate a total respective scenario score by scaling each scenario score using the respective total similarity score.

In some embodiments, the identifying markers may include a name, an item description, and a class. The scenario scores may include one or more values assigned to at least one of a response time, a cost differential, and a contract state.

DETAILED DESCRIPTION OF THE INVENTION

Figure 1:
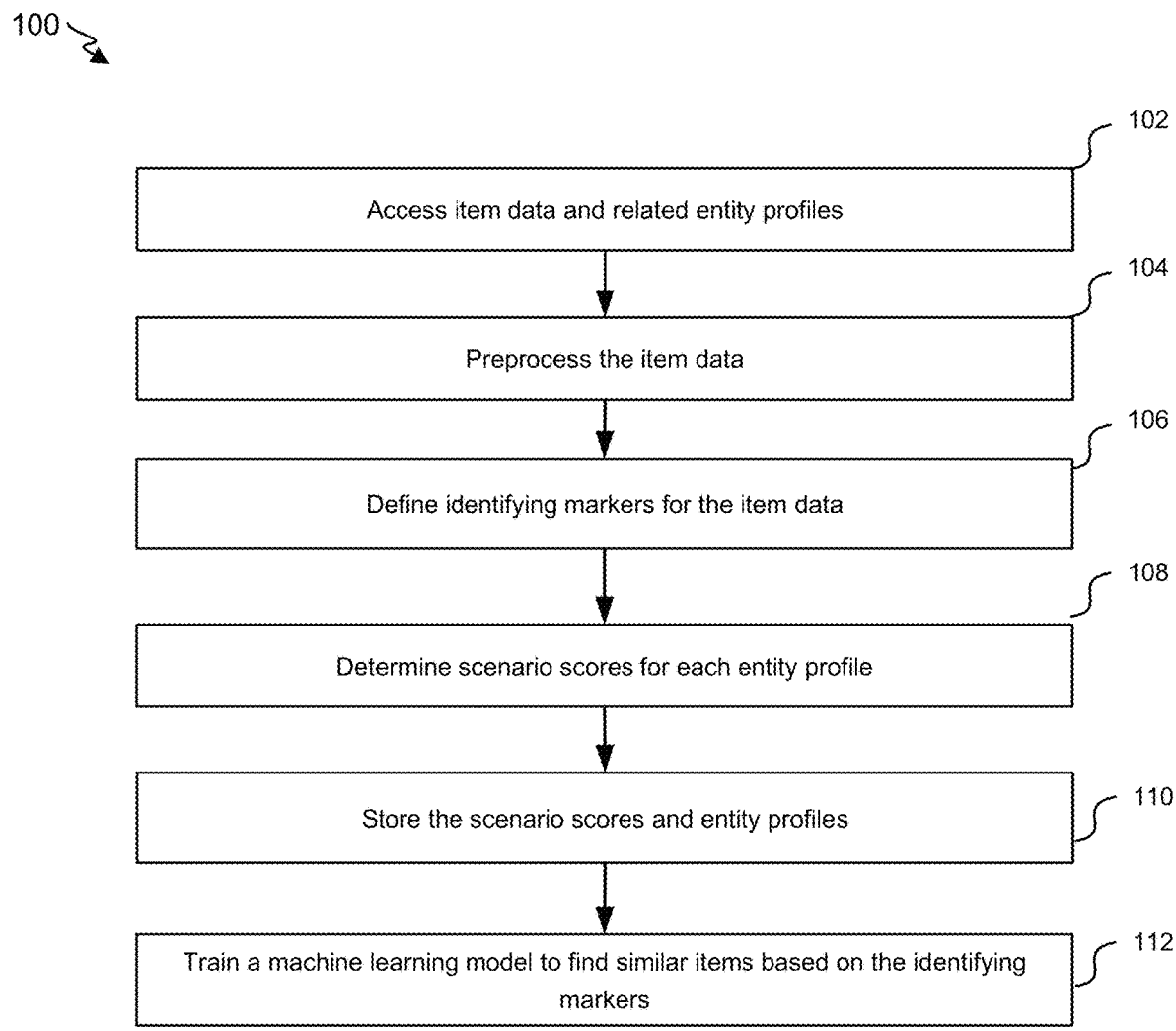
FIG. 1 shows a flowchart of a method of training a machine learning model to find one or more similar items, according to certain embodiments.

Items may frequently be obtained from one or more entities (e.g., supply entities) by members (or "users") of a particular group or organization (e.g., a company). Users may not be aware of the respective entities engaged to obtain the items, due to being remote, located in different geographical locations, or any other reason. In many cases, different users within the group may have similar item needs (e.g., a laptop or other computing device). Further, multiple entities may be willing to provide the same or similar item. The organization, therefore, may end up with multiple relationships with multiple entities, leading to inefficiencies.

Also, various users may not have the information needed to obtain items from an entity best suited to their needs. For example, the user may require the most prompt provision of an item, whereas a cost may not be as important. A user may perform diligence on their own, or sort through records or profiles of various entities in order to find the best match, taking time and having a high chance for missing qualities of the various entities. The user may also search for an item in a database using different terms than other users for a similar item, and find irrelevant results or no results. In order to improve the accuracy of the user's search, as well as improve efficiency, a system for generating an entity list is needed, such that the entities on the list are ranked by various metrics. Besides improving accuracy and efficiency, such a system, may also allow the organization to streamline the entities with which it maintains relationships.

In order to build such a system, a plurality of identifying markers associated with one or more items obtained by the organization may be identified by members of the organization and/or by word or character recognition software The one or more items and associated identifying markers may be used to train a machine learning model to find similar items from the one or more items. Examples of identifying markers may include an item name, a hierarchy designation (e.g., a class), a line description of an item, or other such identifying markers.

Concurrently, entity profiles associated with the one or more items may be created and stored by a server or other appropriate device. The entity profiles may include information associated with the entity associated with a particular item (e.g., the entity may be a computer wholesaler that supplies a computer to the user). Examples of information included in the entity profile may include a response time (as measured by an initial request to a delivery), a cost differential (e.g., the quoted cost vs. the final cost), or any other characteristic related to the entity and the item. The entity profile may also include information associated with the entity generally, such as a carbon footprint and/or a human rights score. Each piece of information in the entity profile may have a scenario score assigned.

A user may then subsequently transmit a request for a query item to the system from a client device. The request may include one or more identifying markers associated with the query item. The identifying markers may include an item name, a line item description, and/or a class. The system may then execute the machine learning model using the one or more identifying markers to find similar items. The machine learning model may provide similarity scores for each of the similar items.

The system may then generate a list of N similar items that are closest to the query item, and include a list of the entities associated with the similar items. The system may access an entity profile associated with the item and the entity, and scale the scenario scores using the similarity score for each of the one or more similar items. The system may then output a list of entities ranked by aggregating the scaled scenario scores associated with each item. Thus, the user may receive a list of entities that most closely match the user's needs in both the item and entity.

In the following description, for the purposes of explanation, specific details are set forth in order to provide a thorough understanding of embodiments of the invention. However, it will be apparent that various embodiments may be practiced without these specific details. The figures and description are not intended to be restrictive.

FIG. 1 shows a flowchart of a method 100 of training a machine learning model to find one or more similar items, according to certain embodiments. At block 102, a computing device may access item data and related respective entity profiles. The computing device may include one or more processors, a non-transitory computer-readable memory, and/or may be in communication with a network such as a Wide Area Network (WAN), Local Area Network, the internet, or other such network.

The item data may be received from a client device. The item data may correspond to one or more strings of text input a plurality of fields on an interface. In some embodiments, the strings of text may include entries by multiple client devices. Thus, the strings of text associated with a given item may be different based on the particular user who entered the particular string The strings of text may be stored in the non-transitory computer readable memory of the computing device, or accessed from some other device via a network connection. The item data may also have been selected from a drop down menu or other suitable method, where the item data in the drop down menu has been previously determined.

The item data may include one or more identifying markers. The one or more identifying markers may include an item name, a hierarchy designation (i.e. a class), a line description of an item (e.g., performance benchmarks, detailed service descriptions, etc.) and/or other information. The item data may further include information including various characteristics related to the item, including physical characteristics (e.g., size, shape, weight), item type, and/or other such characteristics, or relate to a service instead of a physical item.

The respective entity profiles may include information associated with an entity associated with a particular item (e.g., the entity may be a computer wholesaler that supplies a computer to the user). Examples of information included in the entity profile may include a response time (as measured by an initial request to a delivery), a cost differential (e.g., the quoted cost vs. the final cost), or any other characteristic related to the entity and the item. The entity profile may also include information associated with the entity generally, such as a carbon footprint and/or a human rights score. Each piece of information in the entity profile may have a scenario score assigned. The above list of examples is not limiting; one of ordinary skill in the art will recognize many different possibilities and combinations.

At block 104, the computing device may preprocess the item data. Preprocessing the item data may include text filtering such as replacing capitalized characters with lowercase characters, an rstrip function (e.g., removing trailing characters such as a space), an lstrip function (e.g., removing leading characters such as a space), and other such text filtering methods. Preprocessing the item data may also include changing the nature of a user entry of one the fields to a different value (e.g., turning a "yes" or "no" to "true" or "false").

Preprocessing the item data may also include data filtering. For example, the item data may include one or more null values (because a user left a field blank, for example). The computing device may discard item data with a predetermined number of null values. Thus, a final item data set may only contain information on items with complete item data.

At block 106, the computing device may define one or more identifying markers for each item based on the respective item data, based on the information. The identifying markers may relate to information about the item include information including various characteristics related to the item, including physical characteristics (e.g., size, shape, weight), type, name, line item description, class, or other characteristics. For example, an item may be a memory device. The identifying markers may then include a memory capacity (e.g., 10 GB), a memory type (e.g., Static Random Access Memory (SRAM)), and a class (e.g., electronics, computer memory). In some embodiments, the computing device may determine the identifying markers according to a predetermined scheme, such as inputs corresponding to a certain field (e.g., a cell in a spreadsheet). In other embodiments, the identifying markers may be received from a client device, in response to a user input in a field of the plurality of fields (e.g., entered as text into the field by a user).

At block 108, the computing device may determine a scenario score based on the item data and respective entity profile. The scenario score may include a numerical value assigned to the respective entity profile and for each item associated with the entity. The scenario scores for each item may be different associated with an entity. For example, an entity may be associated with a first item and a second item. Information in the respective entity profile associated with the first item may be characterized by different values that that associated with the second item (e.g., the response time associated with the first item may be shorter than the response time associated with the second item). Thus, the scenario score for the first item may be different than the scenario score of the second item, even though the entity associated with each may be identical.

At block 110, after determining the scenario scores for each of the respective entity profiles, the item data, the scenario scores, and the respective entity profiles may be stored in a database. In some embodiments, the scenario scores and the respective entity profiles may be stored on a device separate from the computing device. In other embodiments, the scenario scores and respective entity profiles may be stored at the computer-readable memory of the computing device.

At block 112, a machine learning model may be trained to find one or more similar items based on the identifying markers. The machine learning model may first determine an importance and a weight of the identifying markers using a technique such as Term Frequency-Inverse Term Frequency Vectorization (TF-IDF). For example, a set of identifying markers of "laptop computer" and "desktop computer" may be provided to the machine learning model. Because "computer" occurs in both identifying markers, the machine learning model may determine that the "computer" is more important than other terms included in the respective identifying markers. Because "desktop" and "laptop" only appear once in the present set of identifying markers, more weight may be given to those terms.

After determining an importance and a weight of identifying markers, the machine learning model may be trained to find one or more similar items to those stored in the database. The machine learning model may use a K-Nearest Neighbors algorithm (KNN) or other suitable machine learning model. Thus, if a request for a query item is made, the machine learning model may use identifying markers associated with the query item to find the similar items in the database by comparing the importance and weight of terms included in the identifying markers.

Figure 2:
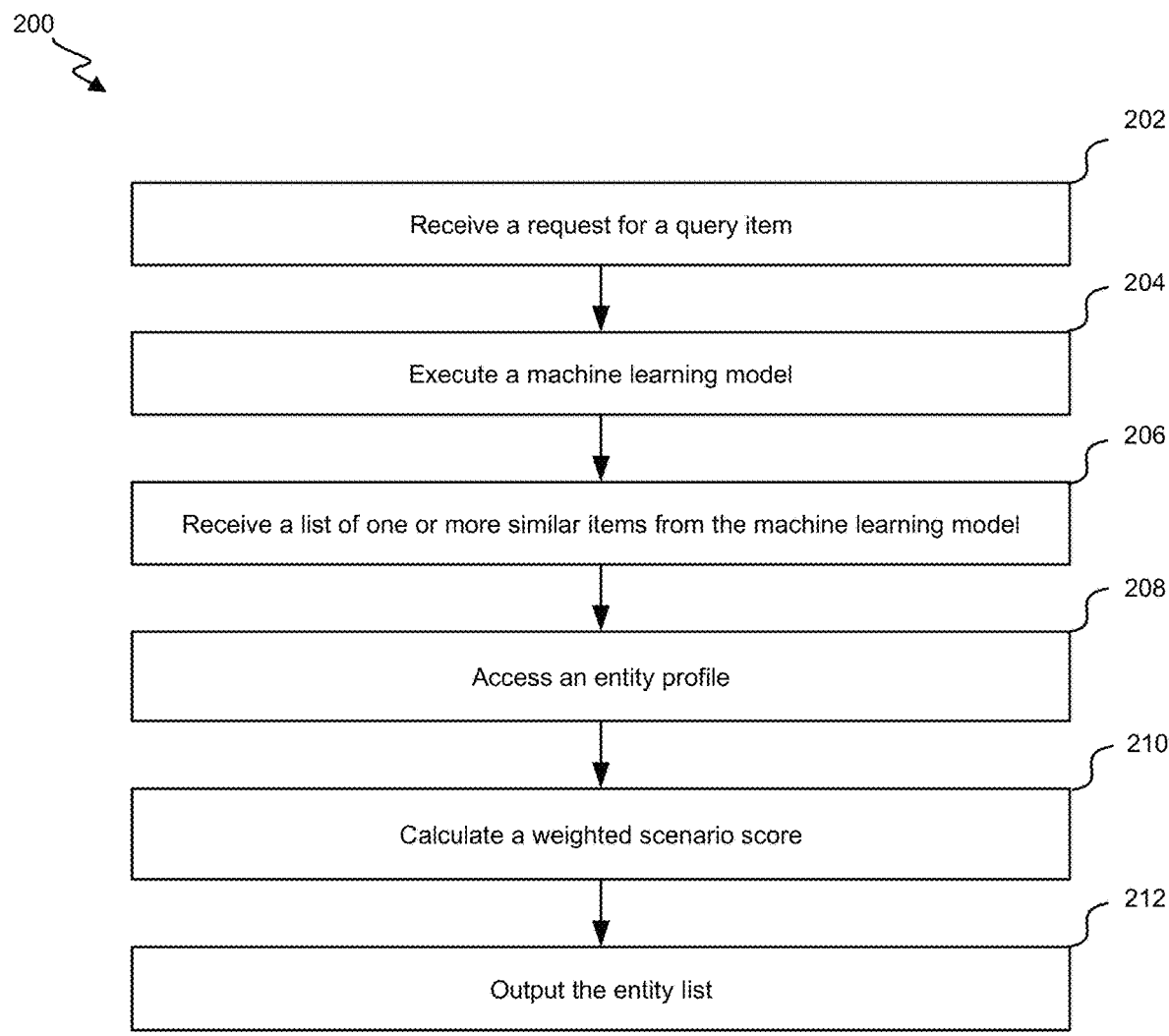
FIG. 2 shows a flowchart of a method for generating an entity list, according to an embodiment.

FIG. 2 shows a flowchart of a method 200 for generating an entity list, according to an embodiment. At block 202 a computing device may receive a request for a query item including a plurality of identifying markers. The query item may relate to a service instead of an item, such as query for a repair service. The request may be provided from a client device, or the request may be made via the computing device. The plurality of identifying markers may be entered into a plurality of fields as one or more strings of text, or chosen from a predetermined list. The plurality of identifying markers may be displayed in a drop down menu or other suitable method. The item data may include an item name, a hierarchy designation (i.e. a class), a line description of an item (e.g., performance benchmarks, detailed service descriptions, etc.), and other such information. The identifying markers may also include information including various characteristics related to the item, including physical characteristics (e.g., size, shape, weight), item type, or other such characteristics.

For example, the query item may be a memory device. The identifying markers may then include a memory capacity (e.g., 10 GB), a memory type (e.g., Static Random Access Memory (SRAM)), and a type designation (e.g., electronics, computer memory). In some embodiments, the computing device may determine the identifying markers according to a predetermined scheme, such as inputs corresponding to a certain field (e.g., a cell in a spreadsheet). In other embodiments, the identifying markers may be determined by a user input in a field of the plurality of fields.

After receiving the request, the item data associated with the query item may be pre-processed. Preprocessing the item data may include text filtering such as replacing capitalized characters with lower-case characters, an rstrip function (e.g., removing trailing characters such as a space), an lstrip function (e.g., removing leading characters such as a space), and other such text filtering methods. Preprocessing the item data may also include changing the nature of a user entry of one the fields to a different value (e.g., turning a "yes" or "no" to "true" or "false").

Preprocessing the item data may also include data filtering. For example, the item data may include one or more null values (because a user left a field blank, for example). The computing device may discard item data with a predetermined number of null values. Thus, a final item data set may only contain information on items with complete item data.

At block 204, the processors may execute a machine learning model (machine learning model) to process the plurality of identifying markers. The machine learning model may be similar to the machine learning model discussed in relation to the method 100 in FIG. 1, and thus determine an importance and a weight of the identifying markers using a technique such as TF-IDF and find similar items using a model such as KNN. The machine learning model may determine one or more similarity distances between the identifying markers associated with the query item and the identifying markers of one or more past items in the database, and generate a list of similar items with respective similarity scores.

At block 206, the computing device may receive the list of similar items from the machine learning model. The computing device may then aggregate the respective similarity distances between the identifying markers associated with query item and each of the one or more past items in a database, generating a total similarity score for each of the items. The computing device may then limit the number of items to a predetermined number of closest items (e.g., N=100). The computing device may then further filter the closest items to include only those items whose total similarity score falls within a predetermined range, generating a list of similar items and respective total similarity scores.

Each of the respective total similarity scores may then be normalized using a cosine distance or other such method. For example, f(x)=(0.5+cos(x)/2), where x is a total similarity distance between the query item and a given item. The output of this function will be a value between 0 and 1, inclusive. Thus, the respective total similarity score may be a value between 0 and 1, inclusive.

At block 208, the computing device may access a respective entity profile including one or more scenario scores for each of the similar items. The scenario score may include a numerical value assigned to the respective entity profile and for the respective similar item associated with the entity. The scenario score may be based on information associated with the entity, associated with a similar item. Examples may include a response time (as measured from an initial request), a cost differential (e.g., the quoted cost vs. the final cost), a contract state (e.g., a successfully completed contract, a pending contract, a failed contract, etc.), and/or any other characteristic related to the entity and the item. The respective entity profile may also include information associated with the entity generally, such as a carbon footprint, a human rights score, or other metric.

At block 210, the computing device may calculate an entity score for each entity associated with a similar item. In an embodiment, the computing device may first compute a weighted specific scenario score for each of the scenario scores, using the scenario scores and respective total similarity score. Each of the scenario scores may be multiplied by the respective total similarity score, generating weighted similarity scores. The weighted scenario scores associated with an entity may then be aggregated to generate a total respective scenario score for each entity.

The total respective scenario scores may then be aggregated for each entity to generate an entity list. In an embodiment, an entity score (ES) may be generated as follows:

$$ES=\Sigma_{k=0}^{t}(S_k*\log(1+TSS))$$

where t is the total number of total scenario scores associated with the entity, $S_k$ is a configuration parameter assigned to each of the total respective scenario scores, and TSS is the value of a particular total respective scenario score. The configuration parameters may be determined by the computing device. In some embodiments, the configuration parameter may set by a user and sent with the request for a query item. Different users may set different configuration parameters for the same query item. Thus, the computing device may calculate a different entity score for the same query item for different users. The entity scores associated with each respective entity may then be used to generate an entity list. The entity list may be ranked by the entity scores associated with each entity or some other predetermined parameter.

At block 212, the entity list may be output to the client device. In some embodiments the entity list is sent from the computing device to the client device via a network connection, such as LAN, WAN, or the internet. In other embodiments, the entity list may be output on a display connected to the computing device.

In some embodiments, the method 200 may include training the machine learning model. The computing device may access a respective entity profile, where the respective entity profile includes a scenario score and item data associated with an item. The computing device may then provide the item data to the machine learning model. Identifying markers associated with the item may be generated using the item data, according to a predetermined scheme, such as inputs corresponding to a certain field (e.g., a cell in a spreadsheet). The machine learning model may then be retrained, at least in part by defining new internal parameters such that the machine learning model may identify the item as similar to a query item. Additionally or in the alternative, training the machine learning model may include one or more blocks from the method 100. Similarly, the method 100 may include one or more of the blocks described above.

In some embodiments, new item data associated with the query item may be generated after a selection of an entity from the entity list. The new item data may be provided to the machine learning model, and machine learning model may be retrained at least in part by defining new internal parameters. In some embodiments, requests for identical query items may come in from multiple users. As discussed above, the requests may therefore include different identifying markers based on differences of entries made by the different users, leading to different entity lists for each user. The users may also select the same entity from their respective entity list. Thus, the new item data associated with the query item may result in multiple identifying markers being associated with the same item, improving future results. Similarly, if an unknown identifying marker is received, the machine learning model may be updated to include the unknown identifying marker. A list of identifying markers, displayed in a drop down menu may also be updated to include the unknown identifying marker.

For example, a first user may request a query item with an identifying marker (here, a "name") of "coat." A second user may request a query item with a name of "jacket." After performing the method 200, the respective entity lists for the first and second user may include an identical entity. If both the first and second users select the identical entity and the same item, the machine learning model may adjust parameters such that the item is associated with both identifying markers "coat" and "jacket." Thus, a subsequent request for a similar item may be improved by having more identifying markers associated with the similar item.

Figure 3:
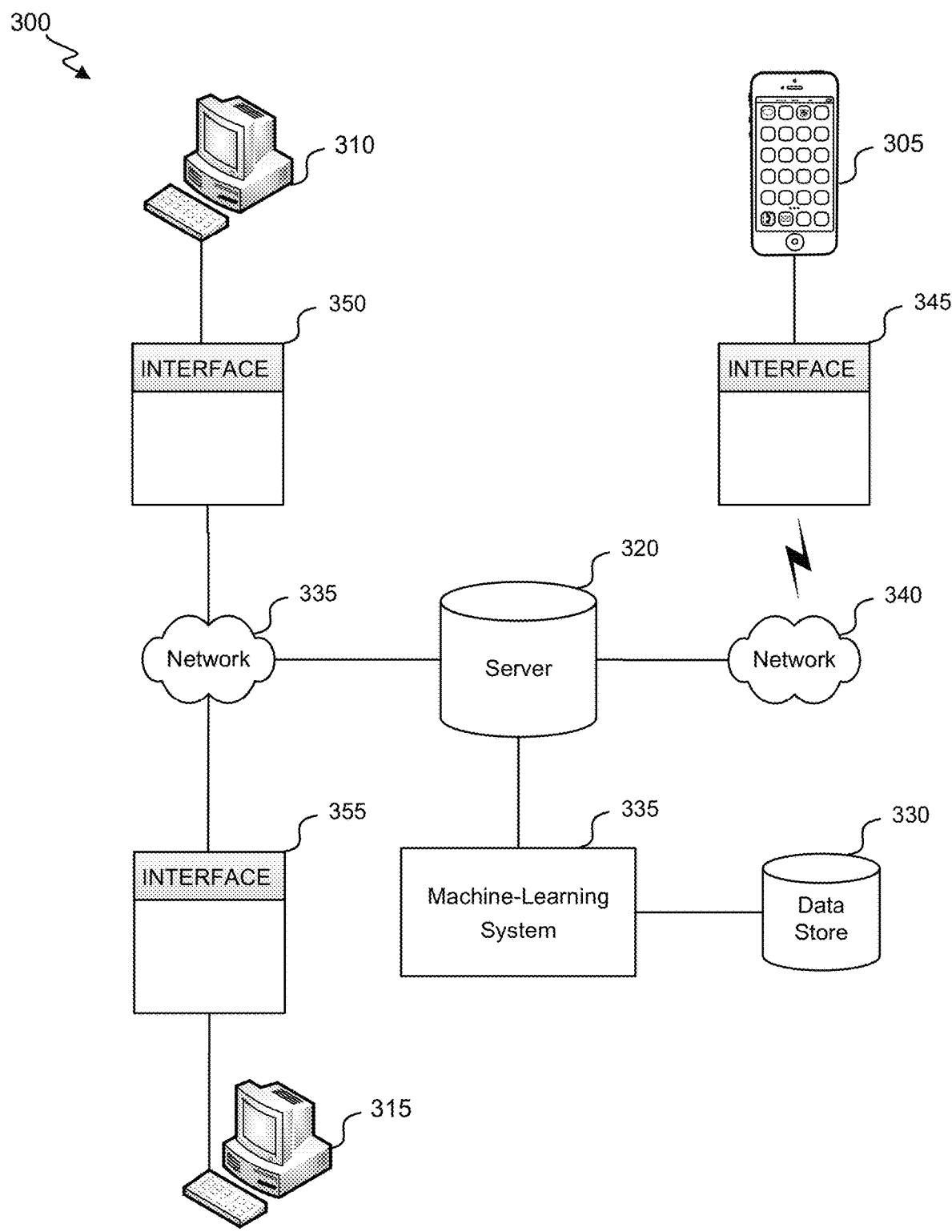
FIG. 3 shows a simplified block diagram of a machine-learning network environment according to an embodiment.

FIG. 3 shows a simplified block diagram of a machine-learning network environment 300, according to certain embodiments. FIG. 3 may be configured to perform all or some of the blocks included in the method 100 and the method 200. As illustrated in the example of FIG. 3, network environment 300 includes client devices 305, 310, and 315. While the illustration of FIG. 3 shows client device 305 as a smartphone and client devices 310 and 315 as desktop computers, it will be appreciated that any number of client devices of any type can be included in network environment 300. In some instances, a client device can be operated by a user (e.g., an employee) associated with an entity (e.g., an employer). Further, client devices 305, 310, and 315 can be configured to connect to a network (e.g., networks 335 and/or 340) in order to transmit one or more requests to server 320. In some instances, a client device may communicate with server 320 using one or more interfaces (e.g., interfaces 345, 350, and 355). In some instances, interfaces 345, 350, 355 are the same interface that facilitates a connection to server 320. In other instances, interfaces 345, 350, and 355 are different from each other, and in some cases, may be different according to security credentials of a user operating the connected client device. For example, interface 345 may include more functionality than interface 350 if the user operating client device 305 has a higher authorization level than the user operating client device 310.

Server 320 may include one or more processors (or other computing devices) in communication (wired or wireless) with one or more data stores. Further, server 320 may be a network location that processes requests received from client devices (via an interface, such as an interface administered by a party). The requests may be a request for a query item, as is described in FIG. 2. Once a request is transmitted from a client device, the request can be sent through one or more networks to be processed at server 320. The of requests processed at server 320 may be stored as a data set for generating machine-learning models. In some instances, the data set can be used for training a supervised learning machine, and in others, for determining correlations between requests using an unsupervised learning machine, such as the method 100 in FIG. 1

Machine-learning system 325 can include one or more servers and/or computing devices that are configured to execute one or more machine-learning algorithms using the data set stored by server 320. The machine-leaning system 325 may determine an importance and a weight of the identifying markers using a technique such as TF-IDF and find similar items using a model such as KNN. The machine-learning system 325 may determine one or more similarity distances between the identifying markers associated with the query item and the identifying markers of one or more items in the database, and generate a list of similar items with respective similarity scores.

The one or more machine-learning algorithms, decision trees, workflows, and/or models can be stored at data store 330. Data store 330 can also store data generated by or for the party (e.g., an entity profile). Non-limiting examples of machine-learning algorithms or techniques can include artificial neural networks (including backpropagation, Boltzmann machines, etc.), bayesian statistics (e.g., bayesian networks or knowledge bases), logistical model trees, support vector machines, information fuzzy networks, Hidden Markov models, hierarchical clustering (unsupervised), self-organizing maps, clustering techniques, and other suitable machine-learning techniques (supervised or unsupervised). For example, machine-learning system 325 can retrieve one or more machine-learning algorithms stored in data store 330 to generate an artificial neural network in order to identify patterns or correlations within the data set. As a further example, the artificial neural network can learn that when a request (in the data set) includes value A and value B, then value C is predicted as relevant data for the user who originally transmitted the request. In yet another example, a support vector machine can be used either to generate output data that is used as a prediction, or to identify learned patterns within the data set.

The data set may include strings of text entered into one or more of a plurality of fields on client devices 310, 315, or 305. The plurality of fields may be defined by a predetermined set of classes. The list of classes may be chosen from a drop down menu or other suitable method. The classes may include an item name, a hierarchy designation (e.g., a class), a line description of an item (e.g., performance benchmarks, detailed service descriptions, etc.), an entity identifier, an entity location, and other such information. The item data may include information including various characteristics related to the item, including physical characteristics (e.g., size, shape, weight), item type, or other such characteristics. The item data may also relate to a service instead of a physical item.

The data set may include one or more respective entity profiles. The respective entity profiles may include information associated with the entity, associated with a particular item. Examples may include a response time (as measured from an initial request), a cost differential (e.g., the quoted cost vs. the final cost), a contract state (e.g., a successfully completed contract, a pending contract, a failed contract, etc.), or any other characteristic related to the entity and the item. The respective entity profile may also include information associated with the entity generally, such as a carbon footprint and a human rights score. The above list of examples is not limiting; one of ordinary skill in the art will recognize many different possibilities and combinations.

Figure 4:
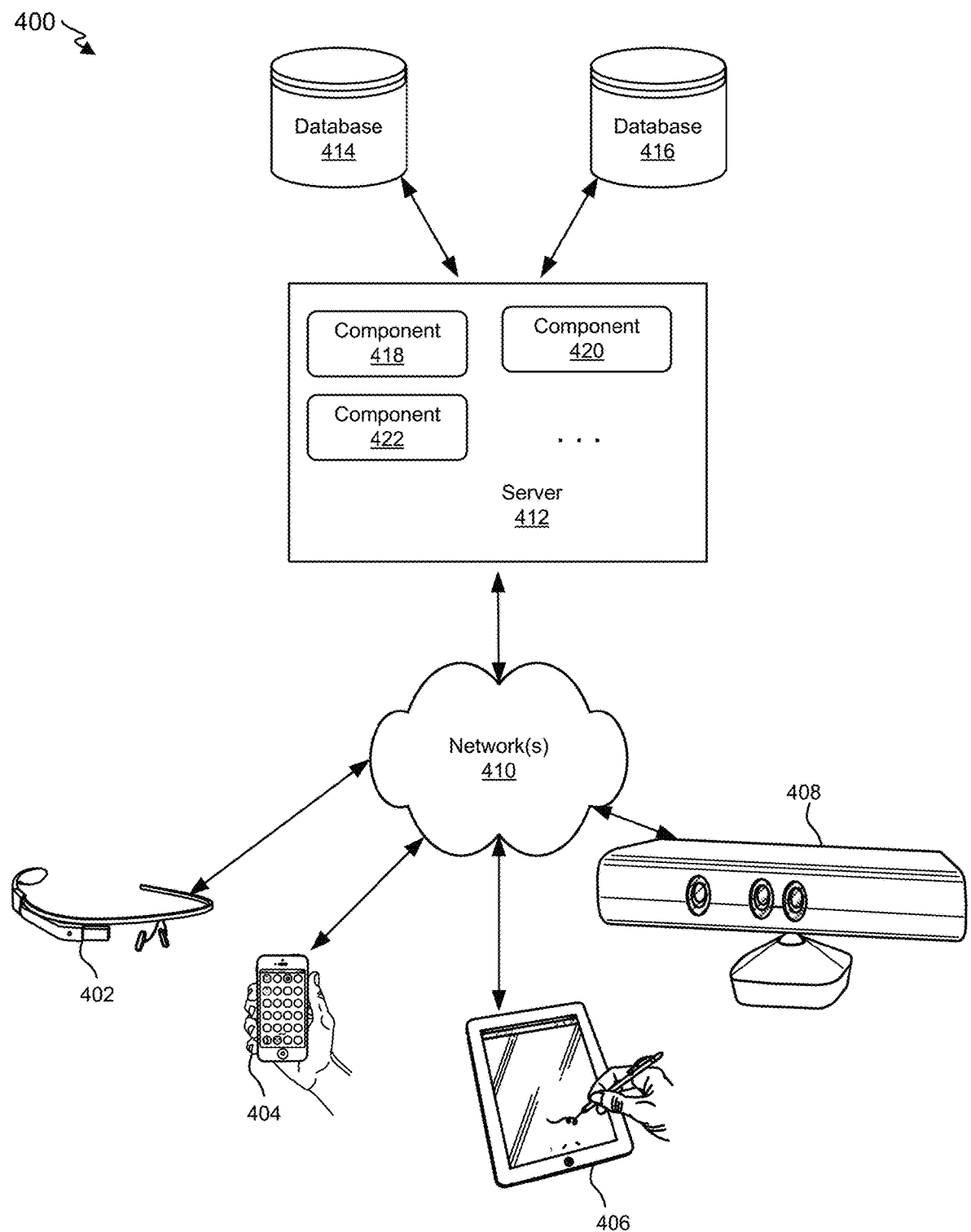
FIG. 4 shows a simplified diagram of a distributed system for implementing one of the embodiments.

FIG. 4 shows a simplified diagram of a distributed system 400 for implementing one of the embodiments. In the illustrated embodiment, distributed system 400 includes one or more client computing devices 402, 404, 406, and 408, which are configured to execute and operate a client application such as a web browser, proprietary client (e.g., Oracle Forms), or the like over one or more network(s) 410. Server 412 may be communicatively coupled with remote client computing devices 402, 404, 406, and 408 via network 410.

In various embodiments, server 412 may be adapted to run one or more services or software applications provided by one or more of the components of the system. In some embodiments, these services may be offered as web-based or cloud services or under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in the figure, the software components 418, 420 and 422 of system 400 are shown as being implemented on server 412. In other embodiments, one or more of the components of system 400 and/or the services provided by these components may also be implemented by one or more of the client computing devices 402, 404, 406, and/or 408. Users operating the client computing devices may then utilize one or more client applications to use the services provided by these components. These components may be implemented in hardware, firmware, software, or combinations thereof. It should be appreciated that various different system configurations are possible, which may be different from distributed system 400. The embodiment shown in the figure is thus one example of a distributed system for implementing an embodiment system and is not intended to be limiting.

Client computing devices 402, 404, 406, and/or 408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 402, 404, 406, and 408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 410.

Although exemplary distributed system 400 is shown with four client computing devices, any number of client computing devices may be supported. Other devices, such as devices with sensors, etc., may interact with server 412.

Network(s) 410 in distributed system 400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 410 can be a local area network (LAN), such as one based on Ethernet, Token-Ring and/or the like. Network(s) 410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 412 may be adapted to run one or more services or software applications described in the foregoing disclosure. For example, server 412 may correspond to a server for performing processing described above according to an embodiment of the present disclosure.

Server 412 may run an operating system including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more databases 414 and 416. Databases 414 and 416 may reside in a variety of locations. By way of example, one or more of databases 414 and 416 may reside on a non-transitory storage medium local to (and/or resident in) server 412. Alternatively, databases 414 and 416 may be remote from server 412 and in communication with server 412 via a network-based or dedicated connection. In one set of embodiments, databases 414 and 416 may reside in a storage-area network (SAN). Similarly, any necessary files for performing the functions attributed to server 412 may be stored locally on server 412 and/or remotely, as appropriate. In one set of embodiments, databases 414 and 416 may include relational databases, such as databases provided by Oracle, that are adapted to store, update, and retrieve data in response to SQL-formatted commands.

Figure 5:
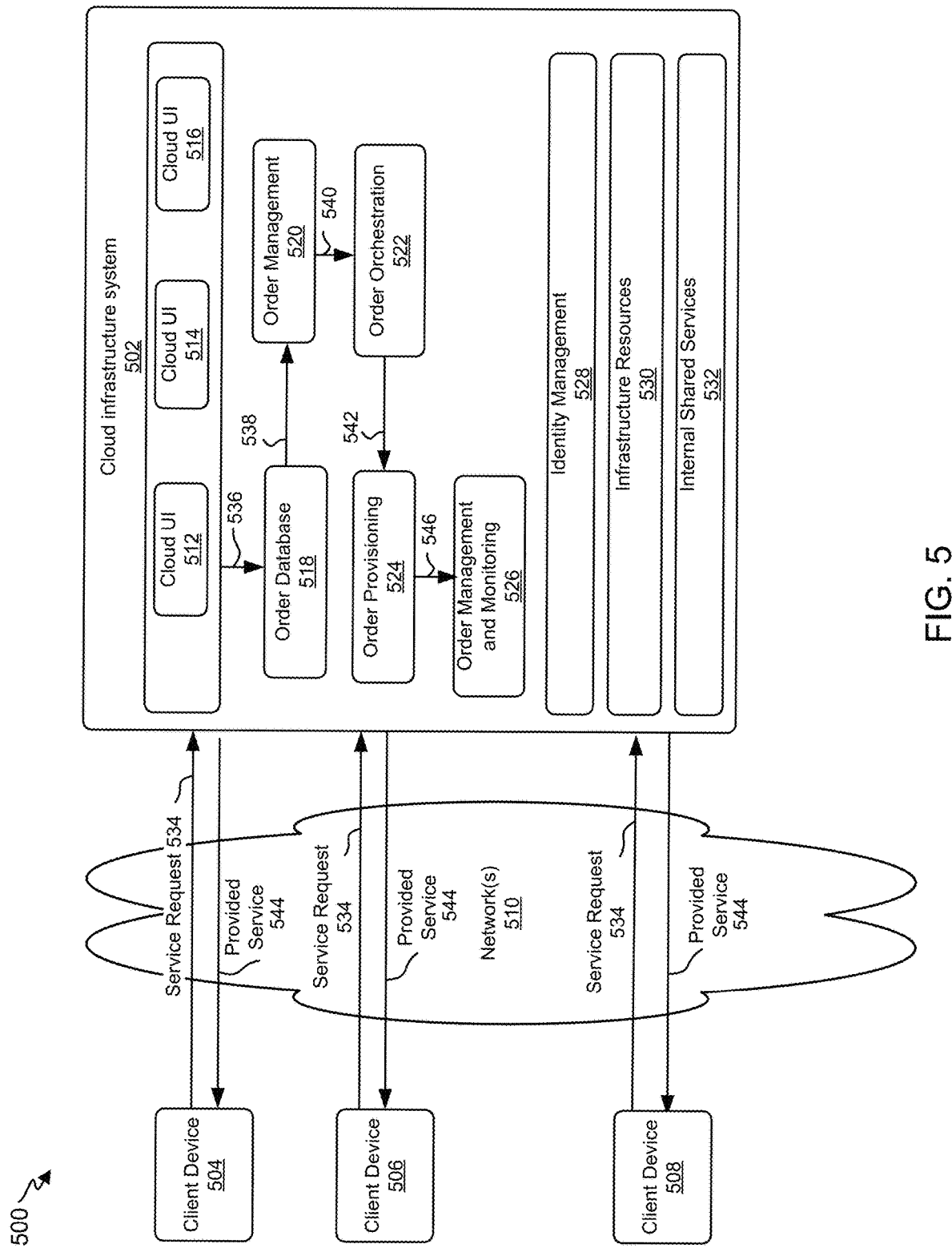
FIG. 5 shows a simplified block diagram of one or more components of a system environment by which services provided by one or more components of an embodiment system may be offered as cloud services, in accordance with an embodiment of the present disclosure.

FIG. 5 shows a simplified block diagram of one or more components of a system environment 500 by which services provided by one or more components of an embodiment system may be offered as cloud services, in accordance with an embodiment of the present disclosure. In the illustrated embodiment, system environment 500 includes one or more client computing devices 504, 506, and 508 that may be used by users to interact with a cloud infrastructure system 502 that provides cloud services. The client computing devices may be configured to operate a client application such as a web browser, a proprietary client application (e.g., Oracle Forms), or some other application, which may be used by a user of the client computing device to interact with cloud infrastructure system 502 to use services provided by cloud infrastructure system 502.

It should be appreciated that cloud infrastructure system 502 depicted in the figure may have other components than those depicted. Further, the embodiment shown in the figure is only one example of a cloud infrastructure system that may incorporate an embodiment of the invention. In some other embodiments, cloud infrastructure system 502 may have more or fewer components than shown in the figure, may combine two or more components, or may have a different configuration or arrangement of components.

Client computing devices 504, 506, and 508 may be devices similar to those described above for 402, 404, 406, and 408.

Although exemplary system environment 500 is shown with three client computing devices, any number of client computing devices may be supported. Other devices such as devices with sensors, etc. may interact with cloud infrastructure system 502.

Network(s) 510 may facilitate communications and exchange of data between clients 504, 506, and 508 and cloud infrastructure system 502. Each network may be any type of network familiar to those skilled in the art that can support data communications using any of a variety of commercially-available protocols, including those described above for network(s) 510.

Cloud infrastructure system 502 may comprise one or more computers and/or servers that may include those described above for server 412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 502 may be adapted to automatically provision, manage and track a customer's subscription to services offered by cloud infrastructure system 502. Cloud infrastructure system 502 may provide the cloud services via different deployment models. For example, services may be provided under a public cloud model in which cloud infrastructure system 502 is owned by an organization selling cloud services (e.g., owned by Oracle) and the services are made available to the general public or different industry enterprises. As another example, services may be provided under a private cloud model in which cloud infrastructure system 502 is operated solely for a single organization and may provide services for one or more entities within the organization. The cloud services may also be provided under a community cloud model in which cloud infrastructure system 502 and the services provided by cloud infrastructure system 502 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 502. Cloud infrastructure system 502 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 502 may also include infrastructure resources 530 for providing the resources used to provide various services to customers of the cloud infrastructure system. In one embodiment, infrastructure resources 530 may include pre-integrated and optimized combinations of hardware, such as servers, storage, and networking resources to execute the services provided by the PaaS platform and the SaaS platform.

In some embodiments, resources in cloud infrastructure system 502 may be shared by multiple users and dynamically re-allocated per demand. Additionally, resources may be allocated to users in different time zones. For example, cloud infrastructure system 530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 532 may be provided that are shared by different components or modules of cloud infrastructure system 502 and by the services provided by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 502, and the like.

In one embodiment, as depicted in the figure, cloud management functionality may be provided by one or more modules, such as an order management module 520, an order orchestration module 522, an order provisioning module 524, an order management and monitoring module 526, and an identity management module 528. These modules may include or be provided using one or more computers and/or servers, which may be general purpose computers, specialized server computers, server farms, server clusters, or any other appropriate arrangement and/or combination.

In exemplary operation 534, a customer using a client device, such as client device 504, 506 or 508, may interact with cloud infrastructure system 502 by requesting one or more services provided by cloud infrastructure system 502 and placing an order for a subscription for one or more services offered by cloud infrastructure system 502. In certain embodiments, the customer may access a cloud User Interface (UI), cloud UI 512, cloud UI 514 and/or cloud UI 516 and place a subscription order via these UIs. The order information received by cloud infrastructure system 502 in response to the customer placing an order may include information identifying the customer and one or more services offered by the cloud infrastructure system 502 that the customer intends to subscribe to.

After an order has been placed by the customer, the order information is received via the cloud UIs, 512, 514 and/or 516.

At operation 536, the order is stored in order database 518. Order database 518 can be one of several databases operated by cloud infrastructure system 530 and operated in conjunction with other system elements.

At operation 538, the order information is forwarded to an order management module 520. In some instances, order management module 520 may be configured to perform billing and accounting functions related to the order, such as verifying the order, and upon verification, booking the order.

At operation 540, information regarding the order is communicated to an order orchestration module 522. Order orchestration module 522 may utilize the order information to orchestrate the provisioning of services and resources for the order placed by the customer. In some instances, order orchestration module 522 may orchestrate the provisioning of resources to support the subscribed services using the services of order provisioning module 524.

In certain embodiments, order orchestration module 522 enables the management of business processes associated with each order and applies business logic to determine whether an order should proceed to provisioning. At operation 542, upon receiving an order for a new subscription, order orchestration module 522 sends a request to order provisioning module 524 to allocate resources and configure those resources needed to fulfill the subscription order. Order provisioning module 524 enables the allocation of resources for the services ordered by the customer. Order provisioning module 524 provides a level of abstraction between the cloud services provided by cloud infrastructure system 500 and the physical implementation layer that is used to provision the resources for providing the requested services. Order orchestration module 522 may thus be isolated from implementation details, such as whether or not services and resources are actually provisioned on the fly or pre-provisioned and only allocated/assigned upon request.

At operation 544, once the services and resources are provisioned, a notification of the provided service may be sent to customers on client devices 504, 506 and/or 508 by order provisioning module 524 of cloud infrastructure system 502.

At operation 546, the customer's subscription order may be managed and tracked by an order management and monitoring module 526. In some instances, order management and monitoring module 526 may be configured to collect usage statistics for the services in the subscription order, such as the amount of storage used, the amount data transferred, the number of users, and the amount of system up time and system down time.

In certain embodiments, cloud infrastructure system 500 may include an identity management module 528. Identity management module 528 may be configured to provide identity services, such as access management and authorization services in cloud infrastructure system 500. In some embodiments, identity management module 528 may control information about customers who wish to utilize the services provided by cloud infrastructure system 502. Such information can include information that authenticates the identities of such customers and information that describes which actions those customers are authorized to perform relative to various system resources (e.g., files, directories, applications, communication ports, memory segments, etc.) Identity management module 528 may also include the management of descriptive information about each customer and about how and by whom that descriptive information can be accessed and modified.

Figure 6:
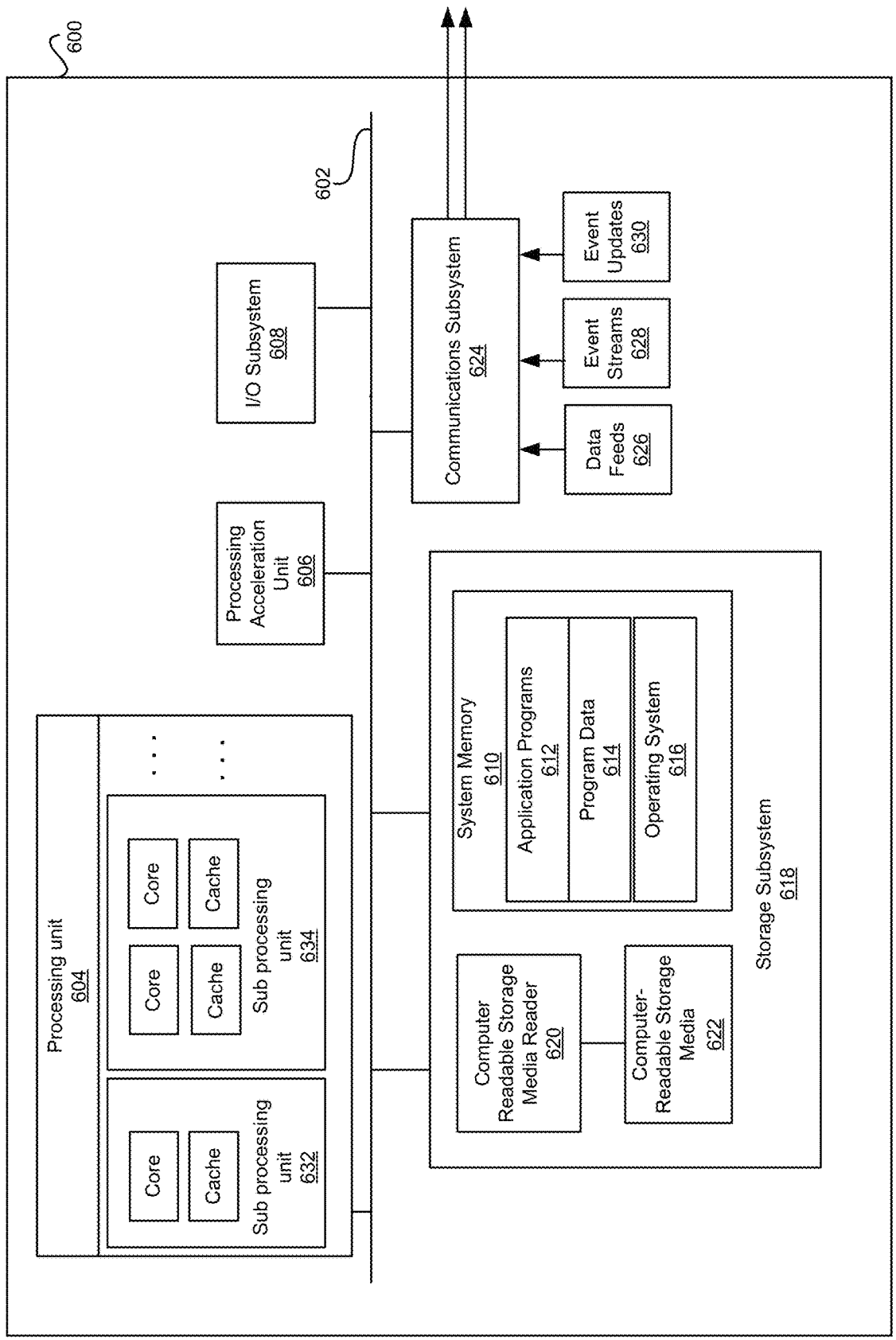
FIG. 6 shows an exemplary computer system, in which various embodiments of the present invention may be implemented.

FIG. 6 shows an exemplary computer system 600, in which various embodiments of the present invention may be implemented. The system 600 may be used to implement any of the computer systems described above. As shown in the figure, computer system 600 includes a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or 634 with single or multicore processors included in each processing unit. In other embodiments, processing unit 604 may also be implemented as a quad-core processing unit formed by integrating two dual-core processors into a single chip.

In various embodiments, processing unit 604 can execute a variety of programs in response to program code and can maintain multiple concurrently executing programs or processes. At any given time, some or all of the program code to be executed can be resident in processor(s) 1204 and/or in storage subsystem 618. Through suitable programming, processor(s) 604 can provide various functionalities described above. Computer system 600 may additionally include a processing acceleration unit 606, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with the present invention.

Storage subsystem 618 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626, event streams 628, event updates 630, and the like on behalf of one or more users who may use computer system 600.

By way of example, communications subsystem 624 may be configured to receive data feeds 626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 624 may also be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for generating an entity list, the method comprising:
    training a machine learning model to determine distances between items of a plurality of items, wherein the training of the machine learning model comprises determining the distances based at least in part on assigning weights of a plurality of weights to a plurality of identifying markers of the plurality of items based at least in part on:
        a first frequency by which identifying markers of the plurality of identifying markers appear in a particular item of the plurality of items;
        a second frequency by which the identifying markers of the plurality of identifying markers appear in the plurality of items;
    receiving, by a processor, a request that includes particular identifying markers that provide information about a query item that is being requested;
    executing, using the processor, the machine learning model to determine a plurality of similarity distances between the query item and each particular item of a plurality of other items, wherein executing the machine learning model comprises:
        determining a respective similarity distance for the particular item, of the plurality of similarity distances for the plurality of other items, based at least in part on respective weights of the plurality of weights and a cosine distance between the particular identifying markers associated with the query item and respective identifying markers of the particular item, wherein the respective similarity distance identifies a distance within a space associated with the machine learning model, wherein the plurality of other items are different than the query item; wherein the plurality of other items are filtered to include one or more other items with similarity distances within a predetermined range; wherein at least one other item outside the predetermined range is not included in the one or more other items;
    accessing, by the processor and for each other item of the one or more other items, a respective entity profile comprising one or more scenario scores, wherein each of the one or more scenario scores is based on a metric associated with characterizing providing the other item by an entity associated with the respective entity profile; wherein the one or more scenario scores are specific to the entity and to the other item and do not include scenario scores specific to the entity and the at least one other item;
    calculating, by the processor, and using the respective similarity distances and one or more scenario scores, an entity score for each respective entity profile to generate the entity list by ranking respective entities, associated with each respective entity profile, using the entity score; wherein calculating the entity score does not include a scenario score for the at least one other item even though the at least one other item has a scenario score for at least one entity in the entity list; and
    outputting, by the processor, the entity list to a client device.

2. The method of claim 1, wherein the request comprises text entered into at least one of a plurality of fields displayed on the client device.

3. The method of claim 2, wherein one of plurality of fields comprises a predetermined list of identifying markers displayed in a drop down menu.

4. The method of claim 1, wherein training the machine learning model further comprises:
    accessing the respective entity profile, wherein the respective entity profile comprises item data associated with an item;
    providing, to the machine learning model, the item data;
    generating, according to a predetermined scheme and using item data, identifying markers associated with the item; and
    retraining the machine learning model, wherein retraining the machine learning model comprises defining new internal parameters associated with the machine learning model.

5. The method of claim 1, wherein calculating the entity score further comprises:
    calculating, by the processor, a total similarity score for each respective similarity distance such that the total similarity scores are within a range of 0 to 1, inclusive; and
    calculating, by the processor, a total respective scenario score by scaling each scenario score using the respective total similarity score.

6. The method of claim 1, wherein the one or more scenario scores comprise one or more numerical values assigned to at least one of a response time, a cost differential, or a contract state.

7. The method of claim 1, wherein the identifying markers comprise at least one of a name, an item description, or a class.

8. A system for generating recommendations, the system comprising:
   one or more processors;
   a non-transitory, computer-readable memory device further comprising a set of processor-executable instructions that cause the one or more processors to:
   train a machine learning model to determine distances between items of a plurality of items, wherein the training of the machine learning model comprises determining the distances based at least in part on assigning weights of a plurality of weights to a plurality of identifying markers of the plurality of items based at least in part on:
      a first frequency by which identifying markers of the plurality of identifying markers appear in a particular item of the plurality of items;
      a second frequency by which the identifying markers of the plurality of identifying markers appear in the plurality of items;
   receive, by the processor, a request for a query item, wherein the request comprises particular identifying markers;
   execute, by the processor, the machine learning model to determine a plurality of similarity distances between the query item and each particular item of a plurality of other items, wherein executing the machine learning model comprises:
   determine a respective similarity distance for the particular item, of the plurality of similarity distances for the plurality of other items, based at least in part on respective weights of the plurality of weights and a cosine distance between the particular identifying markers associated with the query item and respective identifying markers of the particular item, wherein the respective similarity distance identifies a distance within a space associated with the machine learning model, wherein the plurality of other items are different than the query item; wherein the plurality of other items are filtered to include one or more other items with similarity distances within a predetermined range; wherein at least one other item outside the predetermined range is not included in the one or more other items;
   access, by the processor and for each other item of the one or more other items, a respective entity profile comprising one or more scenario scores, wherein each of the one or more scenario scores is based on a metric associated with characterizing providing the other item by an entity associated with the respective entity profile; wherein the one or more scenario scores are specific to the entity and to the other item and do not include scenario scores specific to the entity and the at least one other item;
   calculate, by the processor, and using the respective similarity distances and one or more scenario scores, an entity score for each respective entity profile to generate the entity list by ranking respective entities, associated with each respective entity profile, using the entity score; wherein calculating the entity score does not include a scenario score for the at least one other item even though the at least one other item has a scenario score for at least one entity in the entity list; and
   output, by the processor, the entity list to a client device.

9. The system of claim 8, wherein the request comprises text entered into at least one of a plurality of fields displayed on the client device.

10. The system of claim 9, wherein one of plurality of fields comprises a predetermined list of identifying markers displayed in a drop down menu.

11. The system of claim 8, wherein the identifying markers comprise at least one of a name, an item description, or a class.

12. The system of claim 8, wherein the set of processor-executable instructions further cause the one or more processors to:
   calculate, by the processor, a total similarity score for each respective similarity distance such that the total similarity scores are within a range of 0 to 1, inclusive; and
   calculate, by the processor, a total respective scenario score by scaling each scenario score using the respective total similarity score.

13. A non-transitory computer-readable medium storing computer-executable code that, when executed by a processor, cause the processor to perform a method for generating an entity list, the method comprising:
   training a machine learning model to determine distances between items of a plurality of items, wherein the training of the machine learning model comprises determining the distances based at least in part on assigning weights of a plurality of weights to a plurality of identifying markers of the plurality of items based at least in part on:
      a first frequency by which identifying markers of the plurality of identifying markers appear in a particular item of the plurality of items;
      a second frequency by which the identifying markers of the plurality of identifying markers appear in the plurality of items;
   receiving, by a processor, a request for a query item, wherein the request comprises particular identifying markers;
   executing, using the processor, the machine learning model to determine a plurality of similarity distances between the query item and each particular item of a plurality of other items, wherein executing the machine learning model comprises:
   determining a respective similarity distance for the particular item, of the plurality of similarity distances for the plurality of other items, based at least in part on respective weights of the plurality of weights and a cosine distance between the particular identifying markers associated with the query item and respective identifying markers of the particular item, wherein the respective similarity distance identifies a distance within a space associated with the machine learning model, wherein the plurality of other items are different than the query item; wherein the plurality of other items are filtered to include one or more other items with similarity distances within a predetermined range; wherein at least one other item outside the predetermined range is not included in the one or more other items;
   accessing, by the processor and for each other item of the one or more other items, a respective entity profile comprising one or more scenario scores, wherein each of the one or more scenario scores is based on a metric associated with characterizing providing the other item by an entity associated with the respective entity profile; wherein the one or more scenario scores are specific to the entity and to the other item and do not include scenario scores specific to the entity and the at least one other item;

calculating, by the processor, and using the respective similarity distances and one or more scenario scores, an entity score for each respective entity profile to generate the entity list by ranking respective entities, associated with each respective entity profile, using the entity score; wherein calculating the entity score does not include a scenario score for the at least one other item even though the at least one other item has a scenario score for at least one entity in the entity list; and outputting, by the processor, the entity list to a client device.

14. The non-transitory computer-readable medium of claim 13, wherein the method performed by the processors further comprises:

training the machine learning model by:
accessing the respective entity profile, wherein the respective entity profile comprising item data associated with an item;
providing, to the machine learning model, the item data;
generating, according to a predetermined scheme and using item data, identifying markers associated with the item; and
adjusting internal parameters associated with the machine learning model to identify the item as similar to a query item.

15. The non-transitory computer-readable medium of claim 13, wherein calculating the entity score further comprises:

calculating, by the processor, a total similarity score for each respective similarity distance such that the total similarity scores are within a range of 0 to 1, inclusive; and calculating, by the processor, a total respective scenario score by scaling each scenario score using the respective total similarity score.

16. The non-transitory computer-readable medium of claim 13, wherein the identifying markers comprise at least one of a name, an item description, or a class.

17. The non-transitory computer-readable medium of claim 13, the one or more scenario scores comprise one or more values assigned to at least one of a response time, a cost differential, or a contract state.

18. The system of claim 8 wherein the one or more scenario scores comprise one or more numerical values assigned to at least one of a response time, a cost differential, or a contract state.

* * * * *